United States Patent
Lai

(10) Patent No.: US 6,196,122 B1
(45) Date of Patent: Mar. 6, 2001

(54) MANUAL JUICER

(76) Inventor: Ming-Hsiung Lai, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/638,137

(22) Filed: Aug. 8, 2000

(51) Int. Cl.[7] .............................. A47J 19/06; A47J 42/34; B30B 9/00; B30B 9/02; B30B 9/06
(52) U.S. Cl. ............................. 99/495; 99/506; 99/508; 100/110; 100/112; 100/125; 100/234
(58) Field of Search ........................... 99/495, 501–508, 99/509, 510, 513, 500, 458; 100/110, 112, 125, 234, 116, 243, 902; 141/121–124; 241/95, 167, 169.1, 169.2; 294/16, 118, 64.1; 30/120.1–120.5; D7/665, 666, 686, 619

(56) References Cited

U.S. PATENT DOCUMENTS

| | | | |
|---|---|---|---|
| D. 372,642 | * 8/1996 | Baines | D7/665 |
| 4,348,950 | * 9/1982 | Harris | 99/510 |
| 4,537,123 | * 8/1985 | Holcomb | 99/510 X |
| 4,714,205 | * 12/1987 | Steinko | 241/95 |
| 5,101,720 | * 4/1992 | Bianchi | 100/112 X |
| 5,165,335 | * 11/1992 | Bianchi | 99/495 X |
| 5,303,640 | * 4/1994 | Gaber et al. | 99/495 |
| 5,370,044 | * 12/1994 | Lackie | 100/125 X |
| 5,463,941 | * 11/1995 | Gibson | 99/495 |
| 5,467,699 | * 11/1995 | Laib | 99/495 |
| 5,513,562 | * 5/1996 | Moor | 100/112 |
| 5,529,252 | * 6/1996 | Baines | 241/95 |
| 5,562,256 | * 10/1996 | Wolman et al. | 241/169.1 |

* cited by examiner

Primary Examiner—Timothy F. Simone

(57) ABSTRACT

A manual juicer has a base container, a grip connected to the base container, a strainer cup disposed in the base container, a pressure device disposed in the strainer cup, and a pressing handle connected to the pressing handle and the base container. The pressing handle has a saddle end. The grip has a pedestal and a bottom corrugation portion.

2 Claims, 4 Drawing Sheets

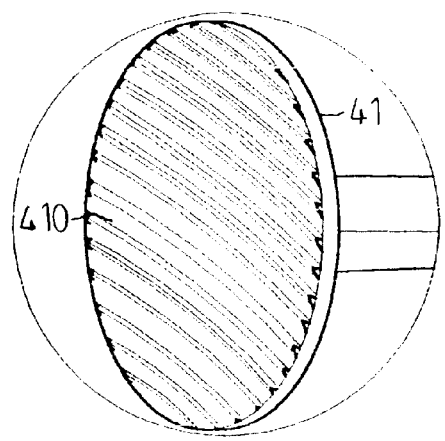
F I G. 1A
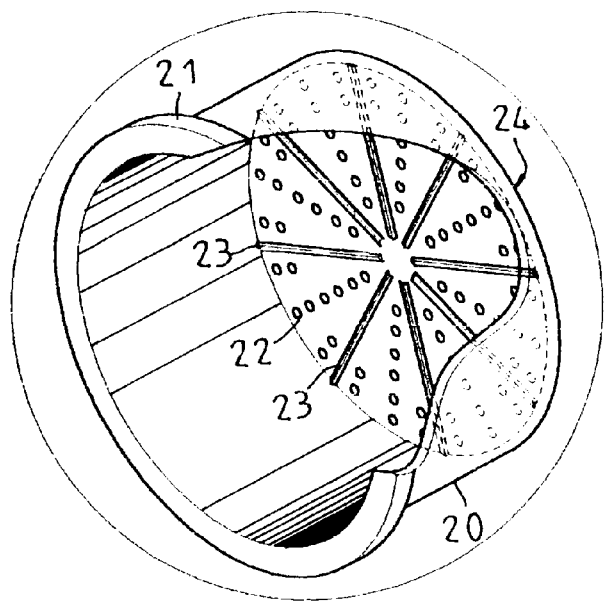
F I G. 1B

MANUAL JUICER

BACKGROUND OF THE INVENTION

The present invention relates to a manual juicer. More particularly, the present invention relates to a juicer which is operated manually.

A conventional manual juicer often cuts a citrous fruit into two parts. However, the citrous peels will be crushed. The crushed citrous peels will release bitter and astringent juices.

SUMMARY OF THE INVENTION

An object of the present invention is to provide a manual juicer which has a camber disk having a plurality of parallel camber grooves to grip citrous peels.

Another object of the present invention is to provide a manual juicer which has a camber disk and a strainer cup having a camber bottom to match the camber disk in order to prevent citrous peels from crushing.

Another object of the present invention is to provide a manual juicer which has a grip having a bottom corrugation portion to be held by a user without sliding.

Another object of the present invention is to provide a manual juicer which has a grip having a pedestal in order to stabilize a base container.

Another object of the present invention is to provide a manual juicer which has a handle having a saddle end to be held by a user without sliding.

Accordingly, a manual juicer comprises a base container, a grip connected to the base container, a strainer cup disposed in the base container, a pressure device disposed in the strainer cup, and a pressing handle connected to the pressing handle and the base container. The base container has an upper lug. A through hole is formed on the upper lug. The strainer cup has an upper flange, a plurality of strainer apertures and a plurality of radiated ribs disposed in a camber bottom of the strainer cup. The pressure device has an upper post, a circular hole, and a camber disk having a plurality of parallel camber grooves. The pressing handle has a saddle end, a pivot end, a through aperture formed on a front portion of the pressing handle, and a lower pillar matching the upper post. The pivot end of the pressing handle has a round hole. A shaft fastens the pressing handle and the pressure device together via the through aperture of the pressing handle and the circular hole of the pressure device. The pivot end of the pressing handle is inserted in the upper lug of the base container. A pivot pin fastens the upper lug of the base container and the pivot end of the pressing handle together via the through hole of the upper lug of the base container and the round hole of the pivot end of the pressing handle.

BRIEF DESCRIPTION OF THE DRAWINGS

FIG. 1A is a bottom view of a disk of a preferred embodiment in accordance with the present invention;

FIG. 1B is a perspective view of a strainer cup of a preferred embodiment in accordance with the present invention;

DETAILED DESCRIPTION OF THE INVENTION

Figure 1:
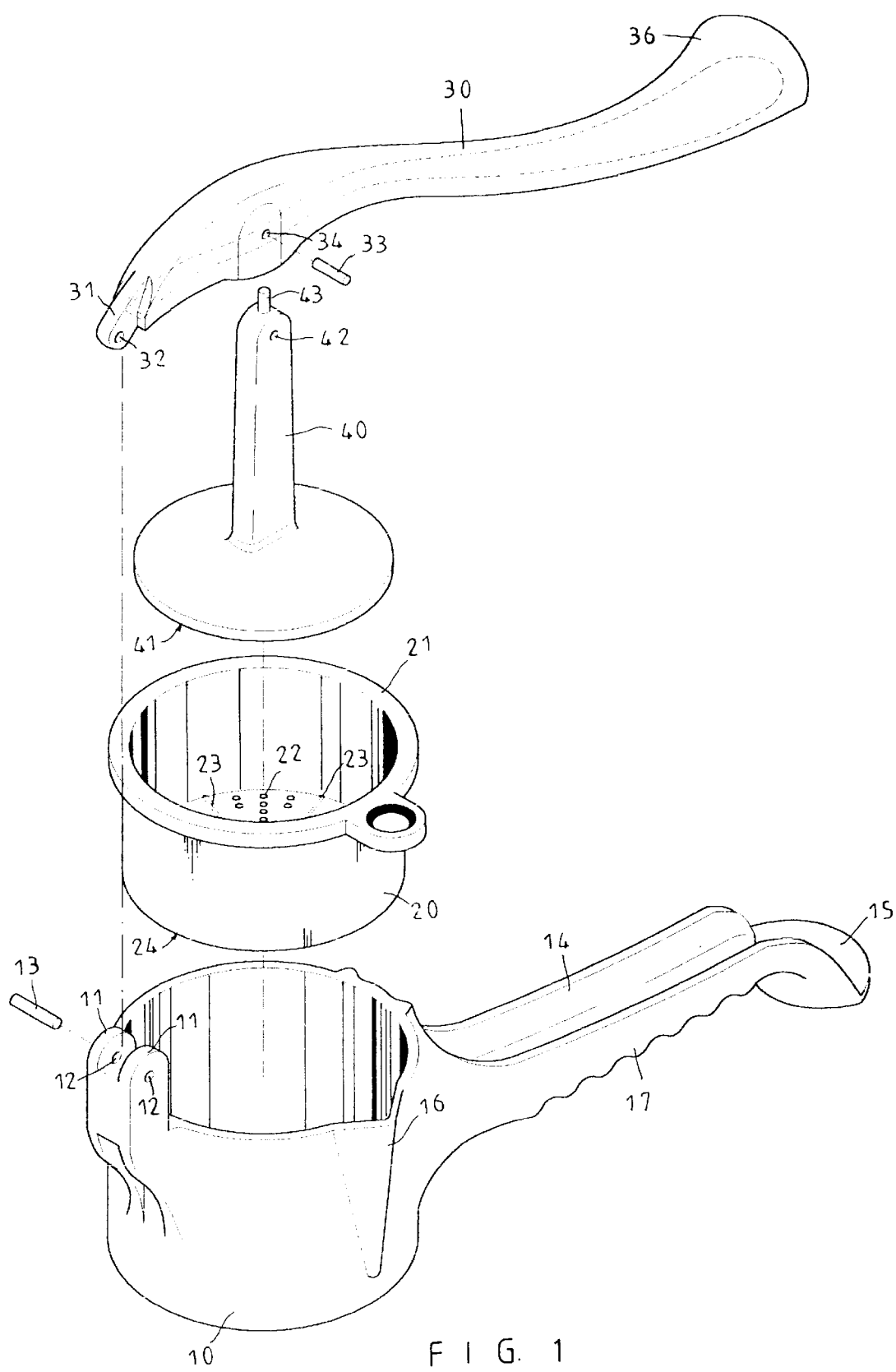
FIG. 1 is a perspective exploded view of a manual juicer of a preferred embodiment in accordance with the present invention.
Figure 2:
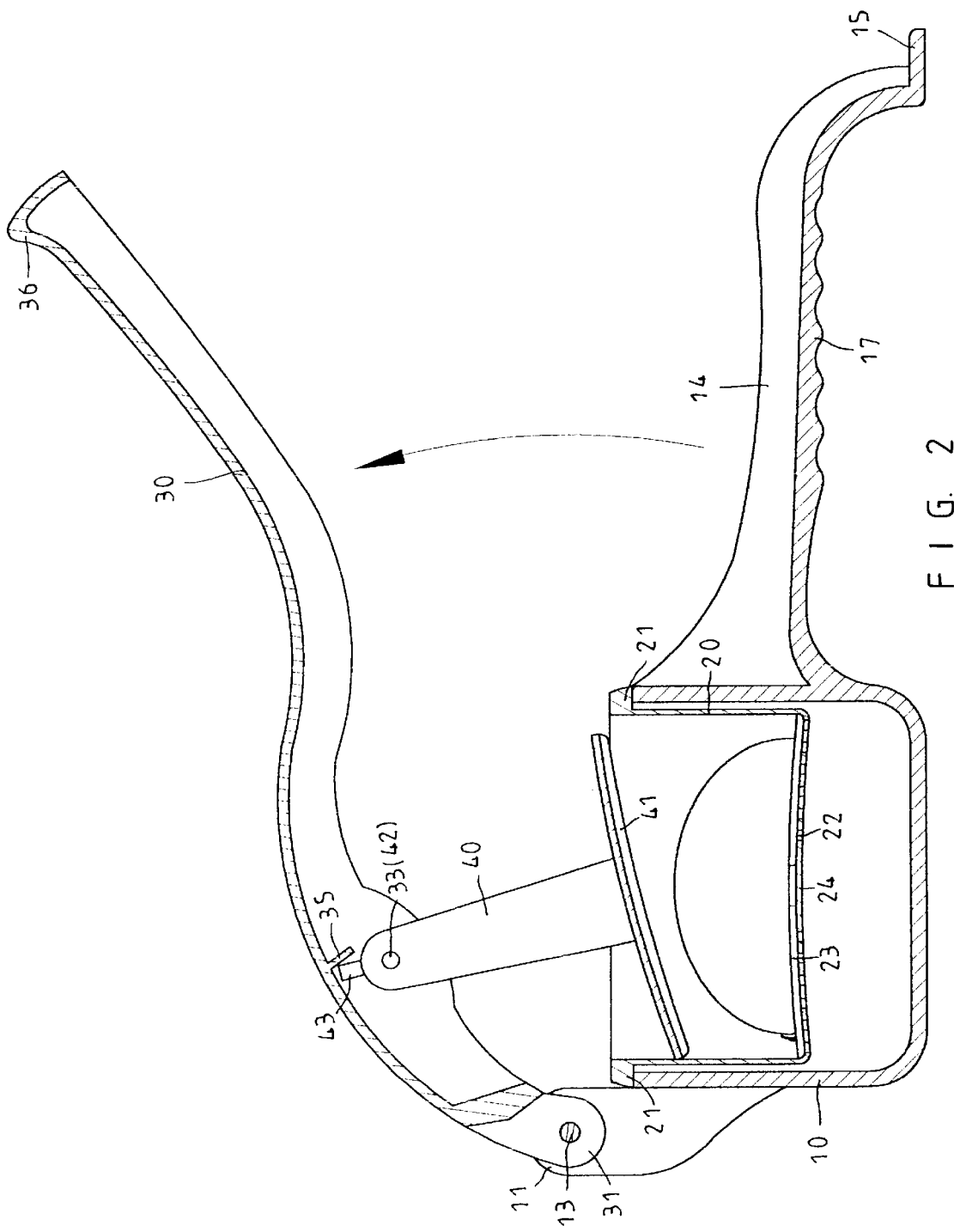
FIG. 2 is a sectional assembly view of a manual juicer of a preferred embodiment in accordance with the present invention.
Figure 3:
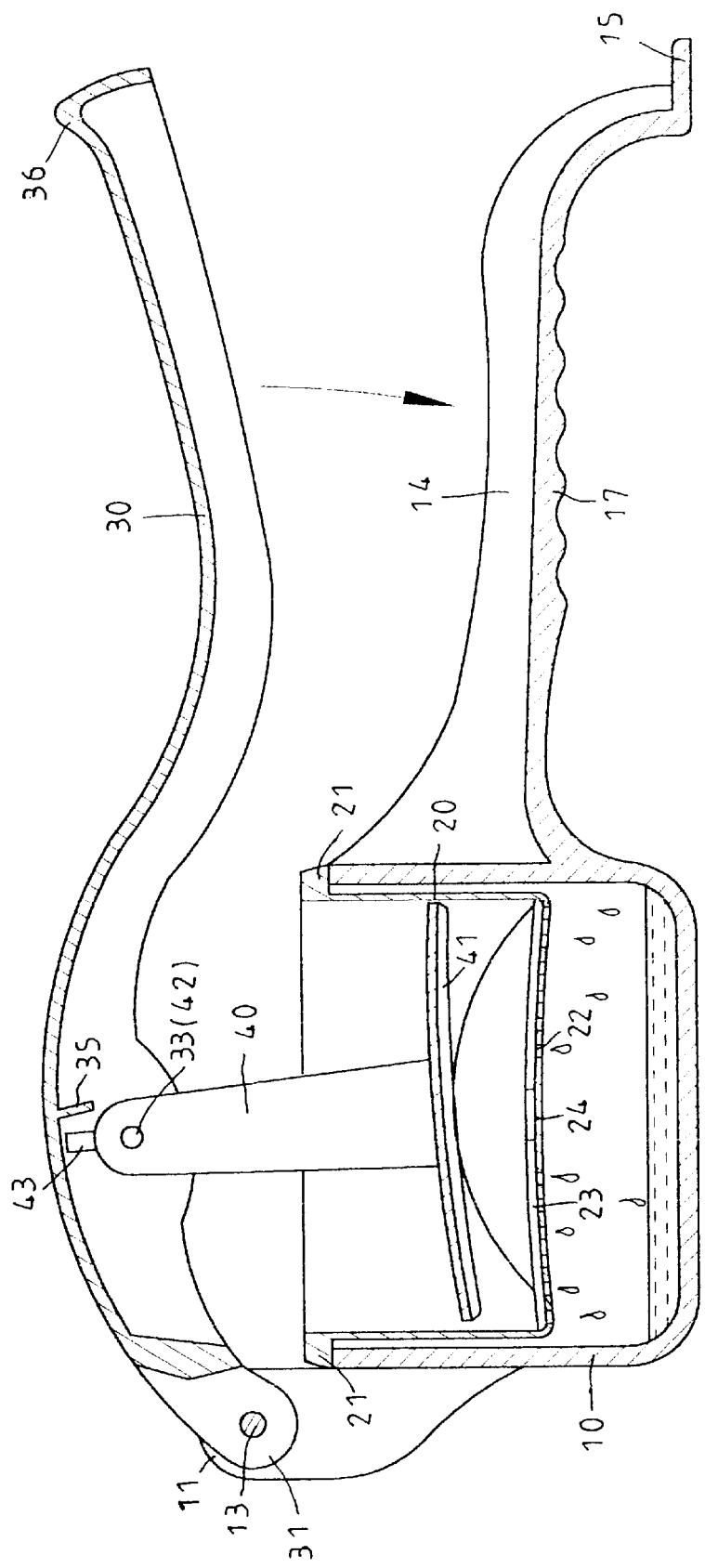
FIG. 3 is a schematic view illustrating an operation of a manual juicer of a preferred embodiment in accordance with the present invention.

Referring to FIGS. 1 to 3, a manual juicer comprises a base container 10, a grip 14 connected to the base container 10, a strainer cup 20 disposed in the base container 10, a pressure device 40 disposed in the strainer cup 20, and a pressing handle 30 connected to the pressing handle 30 and the base container 10.

The base container 10 has an upper lug 11 and a mouth 16. A through hole 12 is formed on the upper lug 11.

The strainer cup 20 has an upper flange 21, a camber bottom 24, a plurality of strainer apertures 22 and a plurality of radiated ribs 23 disposed in the camber bottom 24 of the strainer cup 20.

The pressure device 40 has an upper post 43, a circular hole 42, and a camber disk 41 having a plurality of parallel camber grooves 410.

The pressing handle 30 has a saddle end 36, a pivot end 31, a through aperture 34 formed on a front portion of the pressing handle 30, and a lower pillar 35 matching the upper post 43.

The pivot end 31 of the pressing handle 30 has a round hole 32.

A shaft 33 fastens the pressing handle 30 and the pressure device 40 together via the through aperture 34 of the pressing handle 30 and the circular hole 42 of the pressure device 40.

The pivot end 31 of the pressing handle 30 is inserted in the upper lug 11 of the base container 10.

A pivot pin 13 fastens the upper lug 11 of the base container 10 and the pivot end 31 of the pressing handle 30 together via the through hole 12 of the upper lug 11 of the base container 10 and the round hole 32 of the pivot end 31 of the pressing handle 30.

The grip 14 has a pedestal 15 and a bottom corrugation portion 17.

When a half citrous fruit is placed in the strainer cup 20, the pressing handle 30 is pressed downward. The lower pillar 35 engages with the upper post 43. Since the shape of the camber disk 41 matches the shape of the camber bottom 24 of the strainer cup 20, citrous peels will not be crushed.

The invention is not limited to the above embodiment but various modification thereof may be made. Further, various changes in form and detail may be made without departing from the scope of the invention.

I claim:

1. A manual juicer comprises:

a base container, a grip connected to the base container, a strainer cup disposed in the base container, a pressure device disposed in the strainer cup, and a pressing handle connected to the pressing handle and the base container, the base container having an upper lug, a through hole formed on the upper lug, the strainer cup having an upper flange, a camber bottom, a plurality of strainer apertures and a plurality of radiated ribs disposed in the camber bottom of the strainer cup, the pressure device having an upper post, a circular hole, and a camber disk having a plurality of parallel camber grooves, the pressing handle having a saddle end, a pivot end, a through aperture formed on a front portion of the pressing handle, and a lower pillar matching the upper post, the pivot end of the pressing handle having a round hole, a shaft fastening the pressing handle and the pressure device together via the through aperture of the pressing handle and the circular hole of the pressure device, the pivot end of the pressing handle inserted in the upper lug of the base container, and a pivot pin fastening the upper lug of the base container and the pivot end of the pressing handle together via the through hole of the upper lug of the base container and the round hole of the pivot end of the pressing handle.

2. The manual juicer as claimed in claim 1, wherein the grip has a pedestal and a bottom corrugation portion.

* * * * *